US012793907B2

(12) United States Patent

Harfman Todorovic et al.

(10) Patent No.: US 12,793,907 B2

(45) Date of Patent: Nov. 10, 2026

(54) MEMS DYNAMIC BEHAVIOR

(71) Applicant: Menlo Microsystems, Inc., Irvine, CA (US)

(72) Inventors: Maja Harfman Todorovic, Northborough, MA (US); Chris Nassar, Hudson, NY (US); Nicholas Guy Yost, Niskayuna, NY (US)

(73) Assignee: Menlo Microsystems, Inc., Irvine, CA (US)

( * ) Notice: Subject to any disclaimer, the term of this patent is extended or adjusted under 35 U.S.C. 154(b) by 325 days.

(21) Appl. No.: 18/430,052

(22) Filed: Feb. 1, 2024

(65) Prior Publication Data

US 2025/0253102 A1 Aug. 7, 2025

(51) Int. Cl.
*H01H 1/00* (2006.01)
*H01H 1/50* (2006.01)

(52) U.S. Cl.
CPC ..... *H01H 1/0036* (2013.01); *H01H 2001/508* (2013.01)

(58) Field of Classification Search
CPC ........... H01H 1/0036; H01H 2001/508; H01H 59/00; H01H 2001/0036; H01H 50/18; H01H 50/44; H01H 47/32; H01H 9/54; H01H 1/00; H01H 50/00
USPC .............................................. 200/181, 19.36
See application file for complete search history.

(56) References Cited

U.S. PATENT DOCUMENTS

| | | | | |
|---|---|---|---|---|
| 6,127,744 | A | 10/2000 | Streeter et al. | |
| 7,473,859 | B2 | 1/2009 | Wright et al. | |
| 7,999,643 | B1 | 8/2011 | Dening et al. | |
| 8,194,382 | B2 | 6/2012 | Ellis et al. | |
| 8,653,699 | B1 | 2/2014 | Dening et al. | |
| 9,159,516 | B2 | 10/2015 | Hammond et al. | |
| 2006/0202933 | A1* | 9/2006 | Pasch ................ | H01H 59/0009 345/94 |
| 2008/0169707 | A1 | 7/2008 | Wright et al. | |
| 2012/0175230 | A1 | 7/2012 | Hammond et al. | |

OTHER PUBLICATIONS

International Search Report and Written Opinion received for PCT Patent Application No. PCT/US2025/013542, mailed on Apr. 23, 2025, 14 pages.

* cited by examiner

*Primary Examiner* — Anthony R Jimenez
(74) *Attorney, Agent, or Firm* — Hamilton, Brook, Smith & Reynolds, P.C.

(57) ABSTRACT

Systems, devices, and methods of controlling a MEMS switch are disclosed. Aspects of this disclosure are directed towards tailoring the turn-on waveform shape, and/or the turn-off waveform shape, of the control signal that is applied to the MEMS switch. The new waveforms may slow down the beam dynamic to eliminate bouncing upon closing and may dampen the dynamic oscillation of the beam after opening.

19 Claims, 6 Drawing Sheets

MEMS DYNAMIC BEHAVIOR

BACKGROUND

Microelectromechanical system (MEMS) switches may "bounce" briefly upon opening or closing before reaching the steady-state position. When bouncing occurs in a "hot" environment, i.e., where (i) a voltage exists upon opening across a first contact electrically coupled to an input port and a second contact electrically coupled to an output port, and/or (ii) where current flows through the first and second contacts upon closing, the bouncing may detrimentally affect the operational characteristics and the overall lifetime of the switch. Improved systems, devices, and methods are needed to address this problem.

SUMMARY

In an aspect, a method of controlling a position of a cantilever beam of a microelectromechanical system (MEMS) switch comprises: applying a control signal during a first time interval, the control signal during the first time interval increasing from a first level to a second level; applying the control signal during a second time interval, the control signal during the second time interval being maintained at the second level; applying the control signal during a third time interval, the control signal during the third time interval decreasing from the second level to a third level; applying the control signal during a fourth time interval, the control signal during the fourth time interval being maintained at the third level; and applying the control signal during a fifth time interval, the control signal during the fifth time interval increasing from the third level to a fourth level.

In various example embodiments, the method further comprises applying the control signal over a sixth time interval, the control signal over the sixth time interval being maintained at the fourth level.

In various example embodiments, the fourth level is about the same as the second level.

In various example embodiments, the control signal is a voltage applied to a gate of the MEMS switch.

In various example embodiments, the second time interval immediately follows the first time interval, the third time interval immediate follows the second time interval, the fourth time interval immediately follows the third time interval, and the fifth time interval immediately follow the fourth time interval.

In various example embodiments, the second time interval immediately follows the first time interval, the third time interval immediately follows the second time interval, the fourth time interval immediately follows the third time interval, the fifth time interval immediately follows the fourth time interval, and the sixth time interval immediately follows the fifth time interval.

In various example embodiments, the control signal during the first time interval linearly increases from the first level to the second level.

In various example embodiments, the control signal during the third time interval linearly decreases from the second level to the third level.

In various example embodiments, the control signal during the fifth time interval linearly increases from the third level to the fourth level.

In various example embodiments, the second level is 90 VDC.

In various example embodiments, the third level is 50 VDC.

In various example embodiments, the fourth level is 90 VDC.

In various example embodiments, the fourth time interval is about one microsecond.

In various example embodiments, the control signal is applied in a hot environment.

In an aspect, a method of controlling a position of a cantilever beam of a microelectromechanical system (MEMS) switch, comprises: applying a control signal during a first time interval, the control signal during the first time interval decreasing from a first level to a second level; applying the control signal during a second time interval, the control signal during the second time interval being maintained at the second level; applying the control signal during a third time interval, the control signal during the third time interval increasing from the second level to a third level; applying the control signal during a fourth time interval, the control signal during the fourth time interval being maintained at the third level; and applying the control signal during a fifth time interval, the control signal during the fifth time interval decreasing from the third level to a fourth level.

In various example embodiments, the method further comprises applying the control signal over a sixth time interval, the control signal over the sixth time interval being maintained at the fourth level.

In various example embodiments, the fourth level is less than the second level.

In various example embodiments, the control signal is a voltage applied to a gate of the MEMS switch.

In various example embodiments, the second time interval immediately follows the first time interval, the third time interval immediate follows the second time interval, the fourth time interval immediately follows the third time interval, and the fifth time interval immediately follow the fourth time interval.

In various example embodiments, the second time interval immediately follows the first time interval, the third time interval immediate follows the second time interval, the fourth time interval immediately follows the third time interval, the fifth time interval immediately follows the fourth time interval, and the sixth time interval immediately follows the fifth time interval.

In various example embodiments, the control signal during the first time interval linearly decreases from the first level to the second level.

In various example embodiments, the control signal during the third time interval linearly increases from the second level to the third level.

In various example embodiments, the control signal during the fifth time interval linearly decreases from the third level to the fourth level.

In various example embodiments, the first level is 90 VDC.

In various example embodiments, the third level is 70 VDC.

In various example embodiments, the second time interval is about one microsecond.

In various example embodiments, the control signal is applied in a hot environment.

In an aspect a control system for controlling a position of a cantilever beam of a microelectromechanical system (MEMS) switch comprises a controller configured to, in a first configuration, apply a control signal to a control port to close the MEMS switch. The control signal may comprise: during a first time interval, increasing from a first level to a second level; during a second time interval, maintaining at the second level; during a third time interval, decreasing from the second level to a third level; during a fourth time interval, maintaining at the third level; and during a fifth time interval, increasing from the third level to a fourth level.

In a second configuration, the controller may be configured to apply a control signal to a control port to open the MEMS switch. The control signal may comprise: during a first time interval, decreasing from a first level to a second level; during a second time interval, maintaining at the second level; during a third time interval, increasing from the second level to a third level; during a fourth time interval, maintaining at the third level; and during a fifth time interval, decreasing from the third level to a fourth level.

In various example embodiments, the control signal is a voltage applied to a gate of the MEMS switch.

In an aspect, a method of controlling a position of a cantilever beam of a microelectromechanical system (MEMS) switch comprises: applying a control signal over a first time interval, the control signal over the first time interval increasing from a first level to a second level; applying the control signal over a second time interval, the control signal over the second time interval decreasing from the second level to a third level; applying the control signal over a third time interval, the control signal over the third time interval increasing from the third level to a fourth level; applying the control signal over a fourth time interval, the control signal over the fourth time interval being maintained at the fourth level; applying the control signal over a fifth time interval, the control signal over the fifth time interval decreasing from the fourth level to a fifth level; applying the control signal over a sixth time interval, the control signal over the sixth time interval increasing from the fifth level to a sixth level; and applying the control signal over a seventh time interval, the control signal over the seventh time interval decreasing from the sixth level to the first level.

In various example embodiments, the fourth level is the same as the second level.

In various example embodiments, the fifth level is the same as the first level.

In various example embodiments, the control signal is a voltage applied to a gate of the MEMS switch.

In various example embodiments, the second time interval immediately follows the first time interval, the third time interval immediate follows the second time interval, the fourth time interval immediately follows the third time interval, the fifth time interval immediately follow the fourth time interval, the sixth time interval immediately follow the fifth time interval, and the seventh time interval immediately follow the sixth time interval.

In various example embodiments, the control signal over the first time interval linearly increases from the first level to the second level.

In various example embodiments, the control signal over the second time interval linearly decreases from the second level to the third level.

In various example embodiments, the control signal over the third time interval linearly increases from the third level to the fourth level.

In various example embodiments, the control signal over the fifth time interval linearly decreases from the fourth level to the fifth level.

In various example embodiments, the control signal over the sixth time interval linearly increases from the fifth level to the sixth level.

In various example embodiments, the control signal over the seventh time interval linearly decreases from the sixth level to the first level.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The term "about" as used herein, refers to a value within +/−10% of the value that is associated with the usage of the term, inclusive of the range limits. For example, about 100 VDC refers to a voltage range between 90 VDC and 110 VDC, with 90 VDC and 110 VDC included.

Figure 1A:
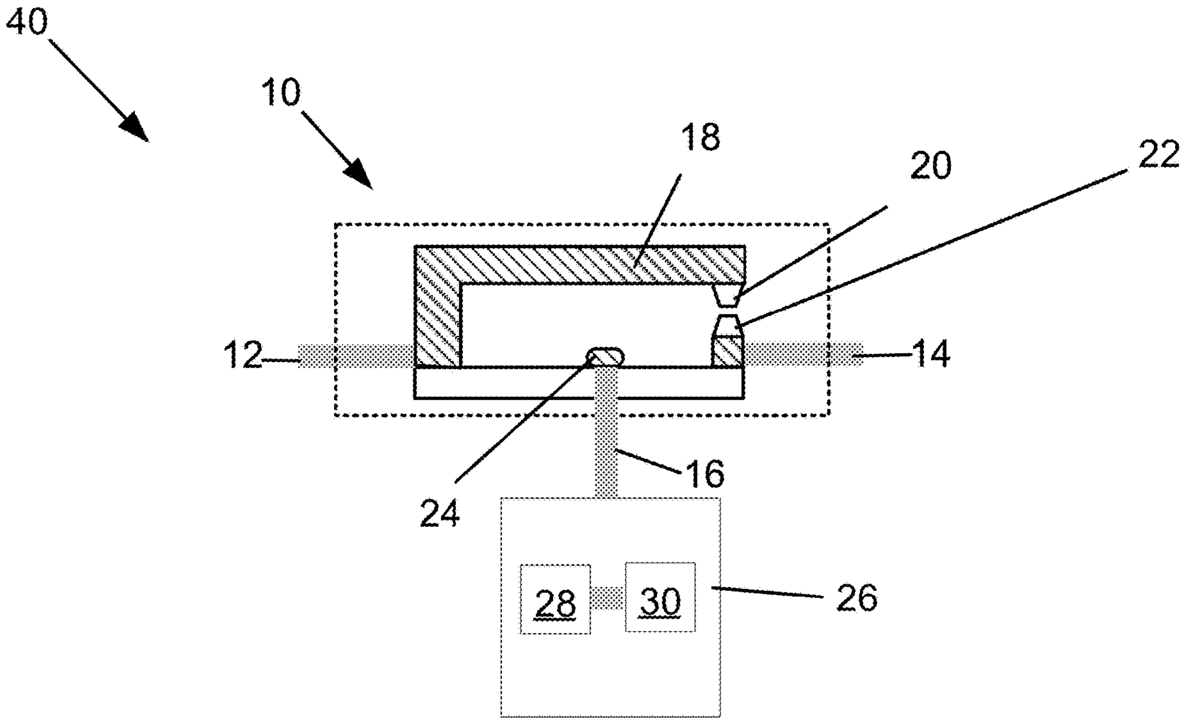
FIG. 1A shows an example embodiment of a control system for controlling a micro-electromechanical system (MEMS) switch.

FIG. 1A shows an example embodiment of a control system 40 for controlling a micro-electromechanical system (MEMS) switch 10. The control system 40 may comprise a MEMS switch 10 and a controller 26, the controller 26 being electrically coupled to the MEMS switch 10.

The MEMS switch may have an input port 12, an output port 14, and a control port 16, as shown in FIG. 1A. The MEMS switch may comprise a beam 18 electrically connected to the input port 12. A first contact 20 may be mechanically and electrically connected to the beam 18, so that the input port 12 is electrically connected to the first contact 20 through the beam 18. A second contact 22 may be disposed near the first contact 20, but not in electrical contact with the first contact 20 when an actuating voltage is not applied to the control port 16. The control port 16 is electrically coupled to an actuation gate 24 of the MEMS switch 10. When a control signal (for example, voltage) is applied to the control port 16, the actuation gate 24 exerts a force on the beam 18, which cause the beam 18 to deflect such that the first contact 20 touches and electrically couples to the second contact 22, thereby creating a low-impedance electrical path from the input port 12 to the output port 14. In alternative embodiments, the control signal may be applied directly to the actuation gate 24, rather than applied to the control port 16.

The controller 26 may comprise one or more processors 28 configured to generate control instructions. In various embodiments, such as the one shown in FIG. 1A, the controller 26 comprises a driver 30. The driver 30 may be electrically coupled to the processor 28. The driver 30 may be configured to receive and amplify a signal received from the processor 28. The driver 30 may deliver a control signal to the control port 16 or the actuation gate 24 of the MEMS switch 10.

MEMS switches may "bounce" briefly upon opening or closing before reaching the steady-state position. When bouncing occurs in a "hot" environment, i.e., where (i) a voltage exists across the contacts 20, 22 upon opening, and/or (ii) where current flows through the contacts 20,22 upon closing, the bouncing may detrimentally affect the operational characteristics and the overall lifetime of the MEMS switch 10.

Aspects of this disclosure are directed towards tailoring the turn-on waveform shape, and/or the turn-off waveform shape, of the control signal that is applied via the control port 16 and/or to the gate 24. The new waveforms may slow down the beam 18 dynamic to eliminate bouncing upon closing and may dampen the dynamic oscillation of the beam 18 after opening.

Figure 1B:
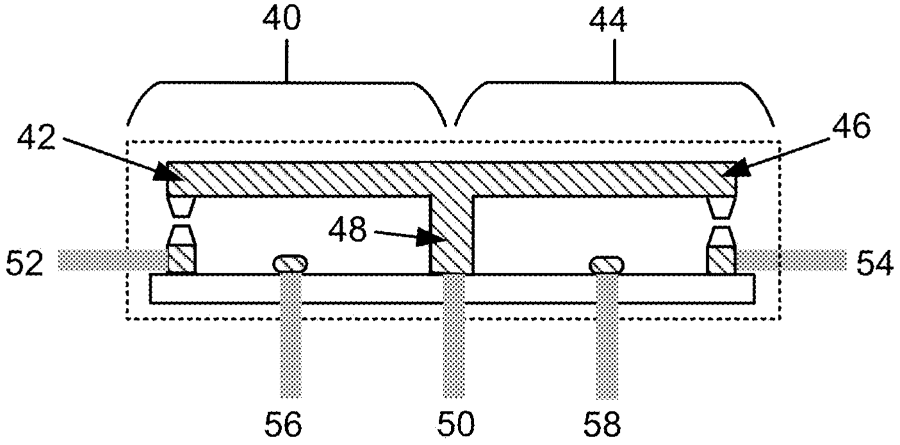
FIG. 1B shows an example embodiment of a back to back configuration of a MEMS switch.

The concepts described herein may also be applicable to a back-to-back (B2B) switch, as shown in FIG. 1B. The B2B switch includes a first portion 40 with a first beam 42, and a second portion 44 with a second beam 46. The first beam 42 and the second beam 46 are mechanically and electrically coupled by a common anchor 48. The B2B switch has a common input 50, a first output 52, and a second output 54. The first switch portion 40 is controlled by a first gate input 56, and the second switch portion is controlled by a second gate input 58.

Figure 2:
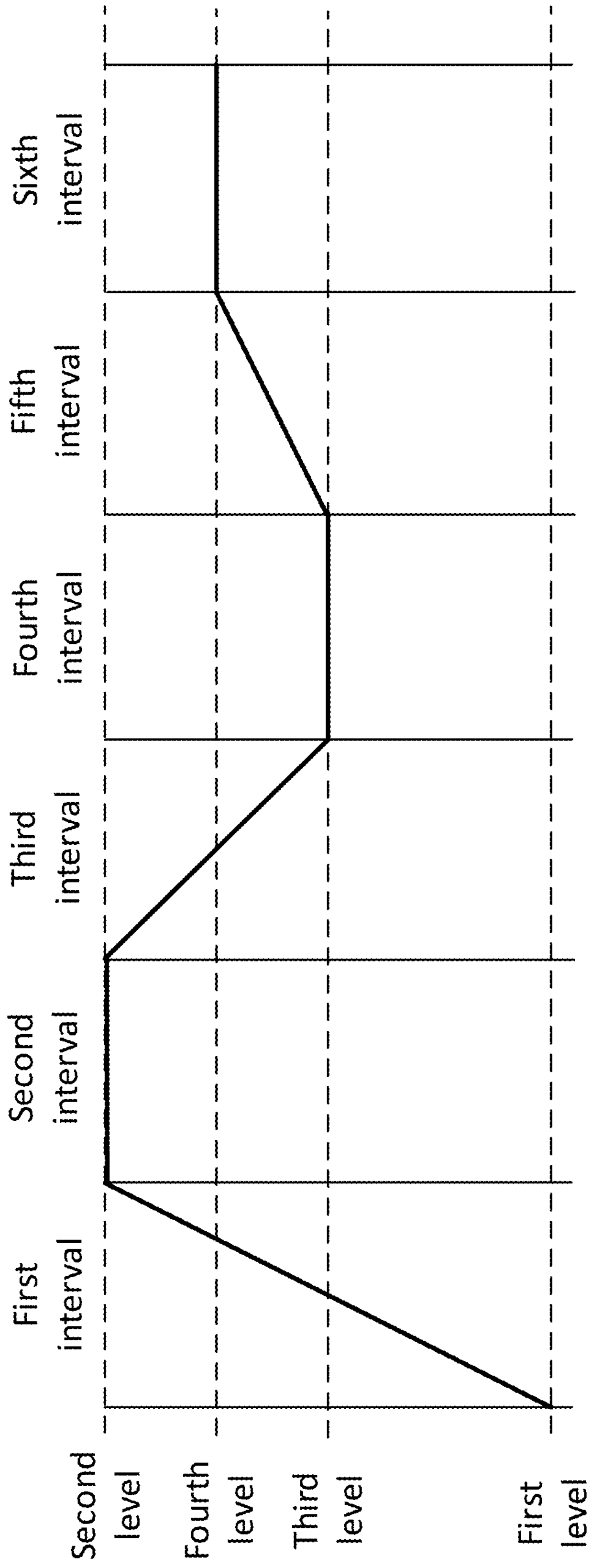
FIG. 2 shows an example embodiment of a control signal for controlling a position of a cantilever beam of a MEMS switch.

FIG. 2 shows an example embodiment of a control signal for controlling a position of a cantilever beam 18 of a MEMS switch 10. In various example embodiments, such as the one shown in FIG. 2, the control signal is applied during a first time interval and during the first time interval the control signal increases from a first level to a second level. In the embodiment shown in FIG. 2, the control signal linearly increases from the first level to the second level. In alternative embodiments, the control signal may increase nonlinearly during the first time interval. In alternative embodiments, the control signal increase during the first time interval may be partially linear and partially nonlinear.

In various example embodiments, such as the one shown in FIG. 2, the control signal is applied during a second time interval and during the second time interval the control signal is maintained at the second level.

In various example embodiments, such as the one shown in FIG. 2, the control signal is applied during a third time interval and during the third time interval the control signal decreases from the second level to a third level. In the embodiment shown in FIG. 2 the control signal linearly decreases from the second level to the third level. In alternative embodiments, the control signal may decrease nonlinearly during the third time interval. In alternative embodiments, the control signal decrease during the third time interval may be partially linear and partially nonlinear.

In various example embodiments, such as the one shown in FIG. 2, the control signal is applied during a fourth time interval and during the fourth time interval the control signal is maintained at the third level. In various example embodiments, the fourth time interval is about one microsecond, although in other embodiments the fourth time interval may be substantially smaller, for example on the order of nanoseconds because the interval values may vary based on, for example, process parameters.

In various example embodiments, such as the one shown in FIG. 2, the control signal is applied during a fifth time interval and during the fifth time interval the control signal increases from the third level to a fourth level. In the embodiment shown in FIG. 2, the control signal linearly increases from the third level to the fourth level. In alternative embodiments, the control signal may increase nonlinearly during the fifth time interval. In alternative embodiments, the control signal increase during the fifth time interval may be partially linear and partially nonlinear.

In various example embodiments, the control signal is applied during a sixth time interval and during the sixth time interval the control signal is maintained at the fourth level.

In various example embodiments, such as the one shown in FIG. 2, the fourth level and the second level are different. In alternative embodiments, the fourth level is about the same as the second level.

In various example embodiments, such as the one shown in FIG. 2, the second time interval immediately follows the first time interval, the third time interval immediately follows the second time interval, the fourth time interval immediately follows the third time interval, and the fifth time interval immediately follow the fourth time interval. In various example embodiments, the sixth time interval immediately follows the fifth time interval.

In alternative embodiments, the second time interval may not immediately follow the first time interval, or the third time interval may not immediately follow the second time interval, or the fourth time interval may not immediately follow the third time interval, or the fifth time interval may not immediately follow the fourth time interval. In various example embodiments, the sixth time interval may not immediately follow the fifth time interval.

In various example embodiments, the control signal is a voltage applied to the MEMS switch 10. In various example embodiments, the control signal is a current applied to the MEMS switch 10. In various example embodiments, the control signal is applied in a "hot" environment.

In various embodiments, the second level may be about 90 VDC. In alternative embodiments, the second level may be a different voltage value. In various example embodiments, the third level may be about 50 VDC. In alternative embodiments, the third level may be a different voltage value. In various example embodiments, the fourth level may be about 90 VDC. In alternative embodiments, the fourth level may be a different voltage value.

Figure 3:
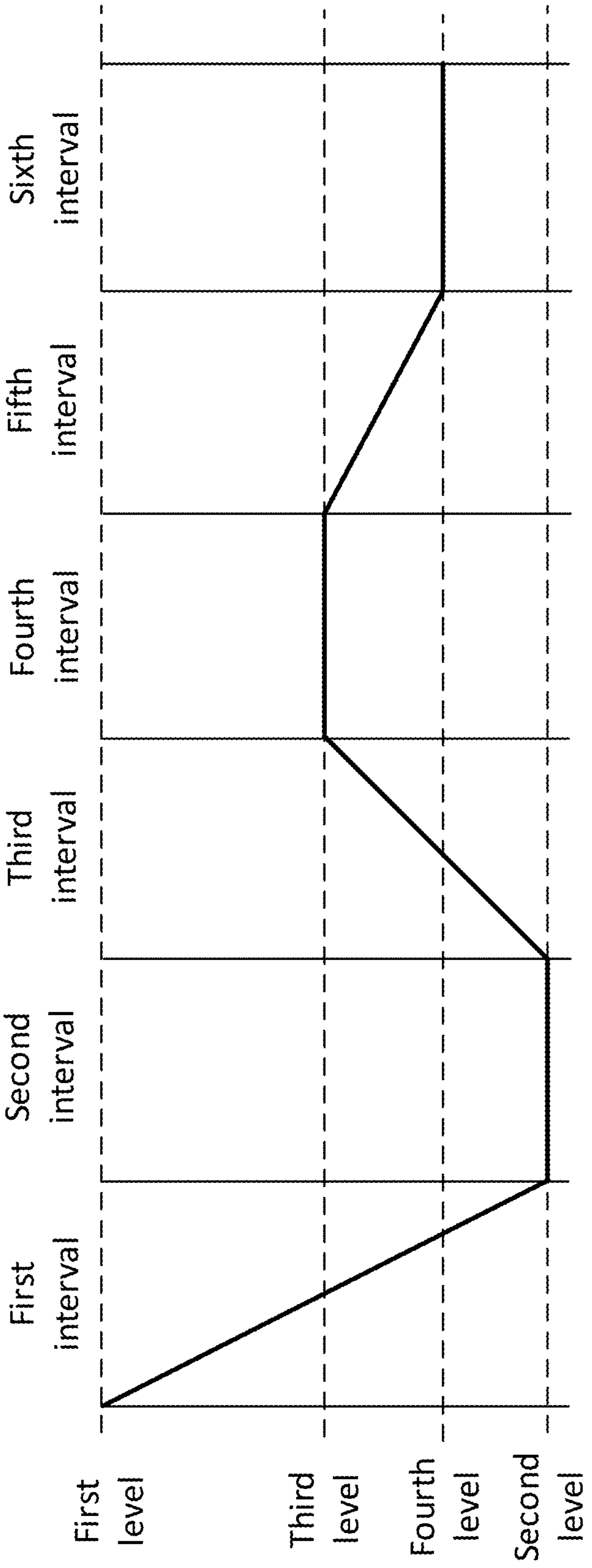
FIG. 3 shows an example embodiment of a control signal for controlling a position of a cantilever beam of a MEMS switch.

FIG. 3 shows an example embodiment of a control signal for controlling a position of a cantilever beam 18 of a MEMS switch 10. In various example embodiments, such as the one shown in FIG. 3, the control signal is applied during a first time interval and during the first time interval the control signal decreases from a first level to a second level. In the embodiment shown in FIG. 3, the control signal linearly decreases from the first level to the second level. In alternative embodiments, the control signal may decrease nonlinearly during the first time interval. In alternative embodiments, the control signal decrease during the first time interval may be partially linear and partially nonlinear.

In various example embodiments, such as the one shown in FIG. 3, the control signal is applied during a second time interval and during the second time interval the control signal is maintained at the second level. In various example embodiments, the second time interval is about one microsecond.

In various example embodiments, such as the one shown in FIG. 3, the control signal is applied during a third time interval and during the third time interval the control signal increases from the second level to a third level. In the embodiment shown in FIG. 3 the control signal linearly increases from the second level to the third level. In alternative embodiments, the control signal may increase nonlinearly during the third time interval. In alternative embodiments, the control signal increase during the third time interval may be partially linear and partially nonlinear.

In various example embodiments, such as the one shown in FIG. 3, the control signal is applied during a fourth time interval and during the fourth time interval the control signal is maintained at the third level.

In various example embodiments, the control signal is applied during a fifth time interval and during the fifth time interval the control signal decreases from the third level to a fourth level. In the embodiment shown in FIG. 3, the control signal linearly decreases from the third level to the fourth level. In alternative embodiments, the control signal may decrease nonlinearly during the fifth time interval. In alternative embodiments, the control signal decrease during the fifth time interval may be partially linear and partially nonlinear.

In various example embodiments, such as the one shown in FIG. 3, the fourth level and the second level are different. In alternative embodiments, the fourth level is about the same as the second level.

In various example embodiments, the control signal is applied during a sixth time interval and during the sixth time interval the control signal is maintained at the fourth level.

In various example embodiments, such as the one shown in FIG. 3, the second time interval immediately follows the first time interval, the third time interval immediately follows the second time interval, the fourth time interval immediately follows the third time interval, and the fifth time interval immediately follow the fourth time interval. In various example embodiments, the sixth time interval immediately follows the fifth time interval.

In alternative embodiments, the second time interval may not immediately follow the first time interval, or the third time interval may not immediately follow the second time interval, or the fourth time interval may not immediately follow the third time interval, or the fifth time interval may not immediately follow the fourth time interval. In various example embodiments, the sixth time interval may not immediately follow the fifth time interval.

In various example embodiments, the control signal is a voltage applied to the MEMS switch 10. In various example embodiments, the control signal is a current applied to the MEMS switch 10. In various example embodiments, the control signal is applied in a “hot” environment.

In various embodiments, the first level may be about 90 VDC. In alternative embodiments, the first level may be a different voltage value. In various example embodiments, the third level may be about 70 VDC. In alternative embodiments, the third level may be a different voltage value.

Figure 4:
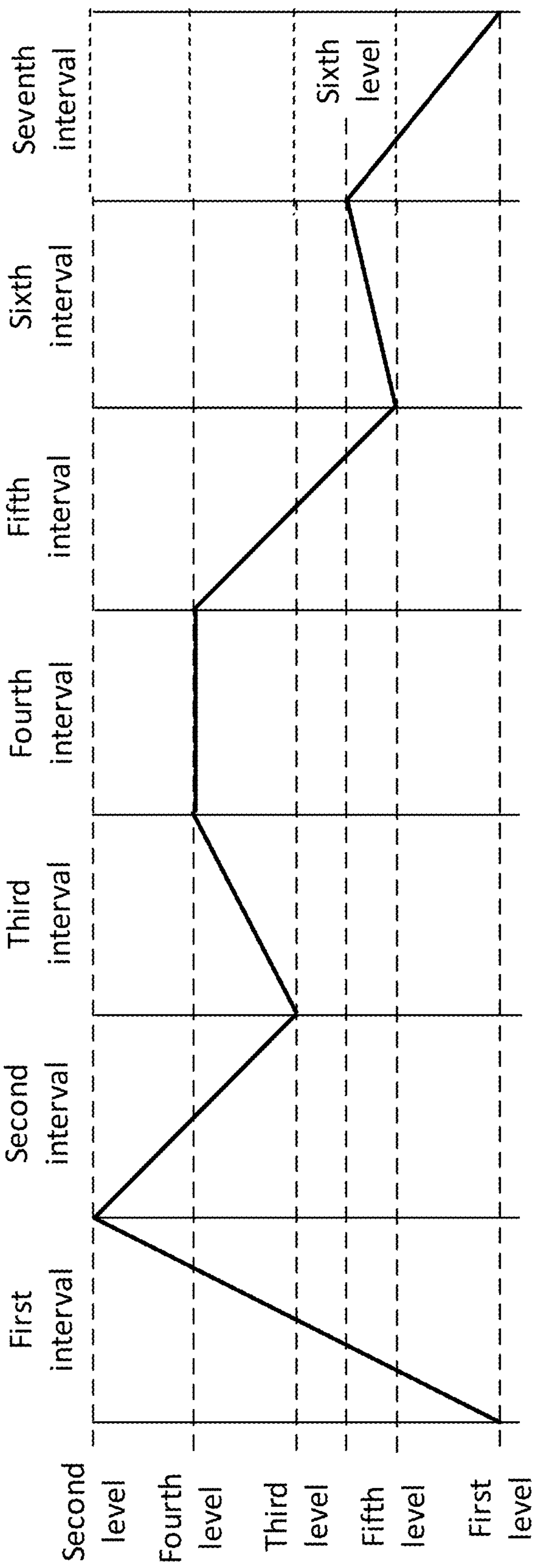
FIGS. 4 and 5 show an example embodiment of a control signal for controlling a position of a cantilever beam of a MEMS switch.
Figure 5:
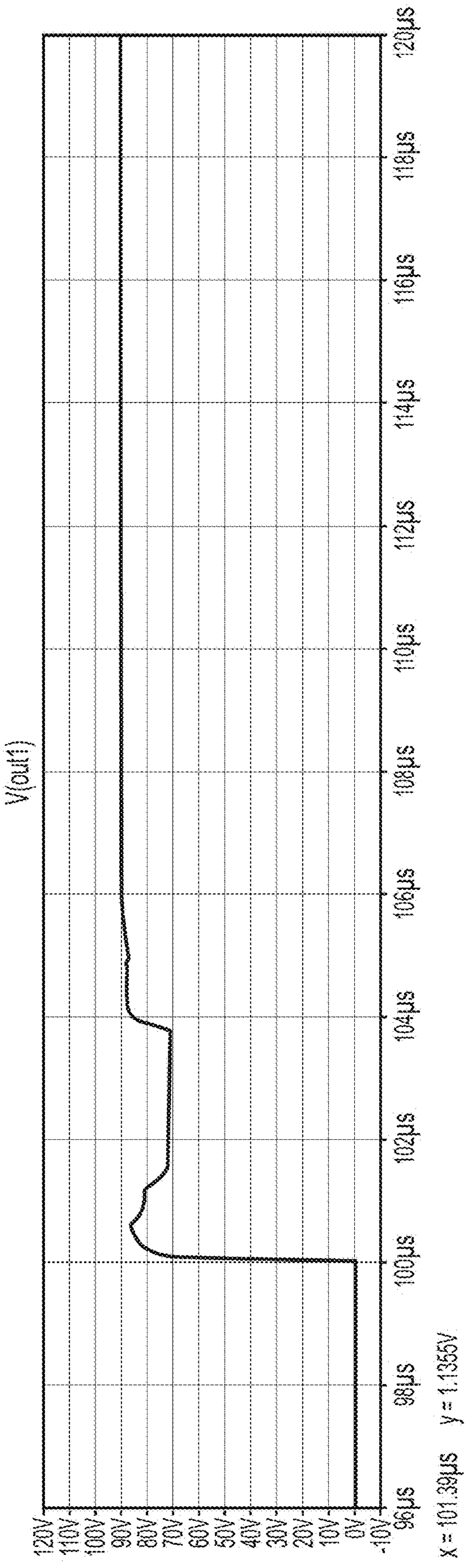

FIG. 4 shows an example embodiment of a control signal for controlling a position of a cantilever beam 18 of a MEMS switch 10. In various example embodiments, such as the one shown in FIG. 4, the control signal is applied during a first time interval and during the first time interval the control signal increases from a first level to a second level. In the embodiment shown in FIG. 4, the control signal linearly increases from the first level to the second level. In alternative embodiments, the control signal may increase nonlinearly during the first time interval. In alternative embodiments, the control signal increase during the first time interval may be partially linear and partially nonlinear.

In various example embodiments, such as the one shown in FIG. 4, the control signal is applied during a second time interval and during the second time interval the control signal decreases from the second level to a third level. In the embodiment shown in FIG. 4, the control signal linearly decreases from the second level to the third level. In alternative embodiments, the control signal may decrease nonlinearly during the second time interval. In alternative embodiments, the control signal decrease during the second time interval may be partially linear and partially nonlinear.

In various example embodiments, such as the one shown in FIG. 4, the control signal is applied during a third time interval and during the third time interval the control signal increases from the third level to a fourth level. In the embodiment shown in FIG. 4 the control signal linearly increases from the third level to the fourth level. In alternative embodiments, the control signal may increase nonlinearly during the third time interval. In alternative embodiments, the control signal increase during the third time interval may be partially linear and partially nonlinear.

In various example embodiments, such as the one shown in FIG. 4, the control signal is applied during a fourth time interval and during the fourth time interval the control signal is maintained at the fourth level.

In various example embodiments, such as the one shown in FIG. 4, the control signal is applied during a fifth time interval and during the fifth time interval the control signal decreases from the fourth level to a fifth level. In the embodiment shown in FIG. 4, the control signal linearly decreases from the fourth level to the fifth level. In alternative embodiments, the control signal may decrease nonlinearly during the fifth time interval. In alternative embodiments, the control signal decrease during the fifth time interval may be partially linear and partially nonlinear.

In various example embodiments, such as the one shown in FIG. 4, the control signal is applied during a sixth time interval and during the sixth time interval the control signal increases from the fifth level to a sixth level. In the embodiment shown in FIG. 4, the control signal linearly increases from the fifth level to the sixth level. In alternative embodiments, the control signal may increase nonlinearly during the sixth time interval. In alternative embodiments, the control signal increase during the sixth time interval may be partially linear and partially nonlinear.

In various example embodiments, such as the one shown in FIG. 4, the control signal is applied during a seventh time interval and during the seventh time interval the control signal decreases from the sixth level to the first level. In the embodiment shown in FIG. 4, the control signal linearly decreases from the sixth level to the first level. In alternative embodiments, the control signal may decrease nonlinearly during the seventh time interval. In alternative embodiments, the control signal decrease during the seventh time interval may be partially linear and partially nonlinear.

In various example embodiments, such as the one shown in FIG. 4, the fourth level and the second level are different. In alternative embodiments, the fourth level is about the same as the second level.

In various example embodiments, such as the one shown in FIG. 4, the fifth level and the first level are different. In alternative embodiments, the fifth level is about the same as the first level.

In various example embodiments, such as the one shown in FIG. 4, the second time interval immediately follows the first time interval, the third time interval immediately follows the second time interval, the fourth time interval immediately follows the third time interval, the fifth time interval immediately follow the fourth time interval, the sixth time interval immediately follows the fifth time interval, and the seventh time interval immediately follows the sixth time interval.

In alternative embodiments, the second time interval may not immediately follow the first time interval, or the third time interval may not immediately follow the second time interval, or the fourth time interval may not immediately follow the third time interval, or the fifth time interval may not immediately follow the fourth time interval, or the sixth time interval may not immediately follow the fifth time interval, or the seventh time interval may not immediately follow the sixth time interval.

In various example embodiments, the control signal is a voltage applied to the MEMS switch 10. In various example embodiments, the control signal is a current applied to the MEMS switch 10. In various example embodiments, the control signal is applied in a "hot" environment.

In various example embodiments, the second level may be about 90 VDC. In alternative embodiments, the second level may be a different voltage value. In various example embodiments, the third level may be about 70 VDC. In alternative embodiments, the third level may be a different voltage value. In various embodiments, the fourth level may be about 90 VDC. In alternative embodiments, the fourth level may be a different voltage value. In various embodiments, the sixth level may be greater than about 110 VDC. In alternative embodiments, the sixth level may be a different voltage value.

While example embodiments have been particularly shown and described, it will be understood by those skilled in the art that various changes in form and details may be made therein without departing from the scope of the embodiments encompassed by the appended claims.

What is claimed is:

1. A method of controlling a position of a cantilever beam of a microelectromechanical system (MEMS) switch, comprising:

applying a control signal during a first time interval, the control signal during the first time interval increasing from a first level to a second level;

applying the control signal during a second time interval, the control signal during the second time interval being maintained at the second level;

applying the control signal during a third time interval, the control signal during the third time interval decreasing from the second level to a third level;

applying the control signal during a fourth time interval, the control signal during the fourth time interval being maintained at the third level; and applying the control signal during a fifth time interval, the control signal during the fifth time interval increasing from the third level to a fourth level.

2. The method of claim 1, wherein the fourth level is about the same as the second level.

3. The method of claim 1, wherein the control signal is a voltage applied to a gate of the MEMS switch.

4. The method of claim 1, wherein the second time interval immediately follows the first time interval, the third time interval immediate follows the second time interval, the fourth time interval immediately follows the third time interval, and the fifth time interval immediately follow the fourth time interval.

5. The method of claim 1, wherein the control signal during the first time interval linearly increases from the first level to the second level.

6. The method of claim 1, wherein the control signal during the third time interval linearly decreases from the second level to the third level.

7. The method of claim 1, wherein the control signal during the fifth time interval linearly increases from the third level to the fourth level.

8. The method of claim 1, wherein the fourth time interval is about one microsecond.

9. The method of claim 1, wherein the control signal is applied in a hot environment.

10. A method of controlling a position of a cantilever beam of a microelectromechanical system (MEMS) switch, comprising:

applying a control signal during a first time interval, the control signal during the first time interval decreasing from a first level to a second level, the control signal is a voltage applied to a gate of the MEMS switch;

applying the control signal during a second time interval, the control signal during the second time interval being maintained at the second level;

applying the control signal during a third time interval, the control signal during the third time interval increasing from the second level to a third level;

applying the control signal during a fourth time interval, the control signal during the fourth time interval being maintained at the third level; and applying the control signal during a fifth time interval, the control signal during the fifth time interval decreasing from the third level to a fourth level.

11. The method of claim 10, wherein the fourth level is less than the second level.

12. The method of claim 10, wherein the second time interval immediately follows the first time interval, the third time interval immediate follows the second time interval, the fourth time interval immediately follows the third time interval, and the fifth time interval immediately follow the fourth time interval.

13. The method of claim 10, wherein the control signal during the first time interval linearly decreases from the first level to the second level.

14. The method of claim 10, wherein the control signal during the third time interval linearly increases from the second level to the third level.

15. The method of claim 10, wherein the control signal during the fifth time interval linearly decreases from the third level to the fourth level.

16. The method of claim 10, wherein the second time interval is about one microsecond.

17. The method of claim 10, wherein the control signal is applied in a hot environment.

18. A control system for controlling a position of a cantilever beam of a microelectromechanical system (MEMS) switch, comprising:

a controller configured to:

in a first configuration, apply a control signal to a control port to close the MEMS switch, the control signal comprising:

during a first time interval, increasing from a first level to a second level;

during a second time interval, maintaining at the second level;

during a third time interval, decreasing from the second level to a third level;

during a fourth time interval, maintaining at the third level; and during a fifth time interval, increasing from the third level to a fourth level;

in a second configuration, apply a control signal to a control port to open the MEMS switch, the control signal comprising:

during a first time interval, decreasing from a first level to a second level;

during a second time interval, maintaining at the second level;

during a third time interval, increasing from the second level to a third level;

during a fourth time interval, maintaining at the third level; and during a fifth time interval, decreasing from the third level to a fourth level.

19. The control system of claim 18, wherein the control signal is a voltage applied to a gate of the MEMS switch.

* * * * *